United States Patent
Velusamy (10) Patent No.: US 8,799,789 B2
(45) Date of Patent: Aug. 5, 2014

(54) METHOD AND SYSTEM FOR PROVIDING ROLE BASED GROUP INSTANT MESSAGING CHAT

(75) Inventor: Umashankar Velusamy, Tampa, FL (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1197 days.

(21) Appl. No.: 12/164,813

(22) Filed: Jun. 30, 2008

(65) Prior Publication Data

US 2009/0327882 A1 Dec. 31, 2009

(51) Int. Cl.
*G06F 3/00* (2006.01)

(52) U.S. Cl.
USPC .......................................... 715/758; 715/753

(58) Field of Classification Search
USPC .................................................. 715/753, 758
See application file for complete search history.

(56) References Cited

U.S. PATENT DOCUMENTS

| | | | |
|---|---|---|---|
| 7,310,625 B2 * | 12/2007 | Wu | 706/50 |
| 7,386,593 B2 * | 6/2008 | Arning et al. | 709/206 |
| 7,844,662 B2 * | 11/2010 | Malik | 709/204 |
| 7,978,838 B2 * | 7/2011 | Rodman et al. | 379/202.01 |
| 2004/0078445 A1 * | 4/2004 | Malik | 709/206 |
| 2004/0114735 A1 * | 6/2004 | Arning et al. | 379/93.24 |
| 2004/0225718 A1 * | 11/2004 | Heinzel et al. | 709/206 |
| 2005/0213731 A1 * | 9/2005 | Rodman et al. | 379/202.01 |
| 2005/0213739 A1 * | 9/2005 | Rodman et al. | 379/202.01 |
| 2006/0031322 A1 * | 2/2006 | Kessen et al. | 709/206 |
| 2006/0036456 A1 * | 2/2006 | Wu | 705/1 |
| 2006/0036562 A1 * | 2/2006 | Wu | 706/50 |
| 2006/0036563 A1 * | 2/2006 | Wu | 706/59 |
| 2007/0005754 A1 * | 1/2007 | Horvitz et al. | 709/224 |
| 2009/0037543 A1 * | 2/2009 | Callanan et al. | 709/206 |
| 2010/0296641 A1 * | 11/2010 | Goel et al. | 379/93.21 |

* cited by examiner

*Primary Examiner* — Shen Shiau (57) ABSTRACT

Embodiments of the invention provide systems and methods for determining an escalation level including receiving one or more requests to join a communication session associated with a situation, identifying information associated with one or more participants that is associated with the one or more requests, determining an escalation level associated with the situation based at least in part on the information associated with the one or more participants, notifying the one or more participants the escalation level associated with the situation and allowing the communication session associated with the situation to filter a participants list and/or communications based on information associated with one or more participants.

27 Claims, 3 Drawing Sheets

METHOD AND SYSTEM FOR PROVIDING ROLE BASED GROUP INSTANT MESSAGING CHAT

BACKGROUND INFORMATION

Instant messaging chat sessions are becoming popular with individual consumers as well as business organizations. Instant messaging chat session offers real-time communication and easy collaboration between participants compared to other forms of communication lack (e.g., email or letter). Also, instant messaging chat session enables a plurality of participants to communicate in a single chat session. Further, instant messaging chat session allows participants the flexibility to enter and/or leave a chat session at will. However often time, whenever a new participant joins an already existing chat session, there may be no way for the existing participants to identify the new participant. Moreover, employees for a business organization may use an instant messaging chat session during a crisis situation (e.g., one or more network elements malfunctions) and the instant messaging chat session may involve a plurality of participants from various departments having different roles (e.g., Developer team member, Manager, database administrator (DBA), Production support). Frequently, participants to an existing instant messaging chat session may not be aware of an escalation level (e.g., level of management involved) associated with the crisis situation. Therefore, recognizing an escalation level for new/existing participants of a chat session may be necessary to identify the seriousness of the crisis situation. Also, recognizing the escalation level for new/existing participants entering a chat sessions may help new/existing participants to identify whom may be involved in the chat session.

BRIEF DESCRIPTION OF THE DRAWINGS

In order to facilitate a fuller understanding of the exemplary embodiments of the present inventions, reference is now made to the appended drawings. These drawings should not be construed as limiting, but are intended to be exemplary only.

These and other embodiments and advantages will become apparent from the following detailed description, taken in conjunction with the accompanying drawings, illustrating by way of example the principles of the various exemplary embodiments.

DETAILED DESCRIPTION OF PREFERRED EMBODIMENTS

An exemplary embodiment provides an instant messaging system and process for identifying one or more new participants entering an instant messaging chat session and/or an escalation level associated with the new participants. The instant messaging system and process may alert one or more existing participants of an instant messaging chat session of an escalation level of the chat session. Also, the instant messaging system and process may allow one or more new participants entering an instant messaging chat session to recognize an escalation level of the chat session. For example, an escalation level may be referred to the level of management involved to resolve a crisis situation, for example, the crisis situation may be defined as malfunction of one or more network hardware and/or software. More specifically, the instant messaging system and process may identify one or more characteristics associated with the one or more new participants which may include titles, management level/role, biographical information, technical background, password, telephone numbers (e.g., work, home, cell, etc), business organizations and/or other characteristics identifying a participant. The management level/role of the one or more participants may include team member (i.e., development) manager, database administrator (DBA), production support, director, president, executive director and/or other members of an organization. Thereafter, the instant messaging system and process may notify one or more existing participants of an instant messaging chat session of the one or more characteristics associated with the one or more new participants. In addition, the instant messaging system and process may notify one or more existing participants of an instant messaging chat session via a visual notification (e.g., color, display, etc.) and/or audio notification (e.g., ring tone, beeping sound etc.).

The description below describes servers, databases, user devices, user interfaces and network elements that may include one or more modules, some of which are explicitly shown, others are not. As used herein, the term "module" may be understood to refer to computing software, firmware, hardware, and/or various combinations thereof. It is noted that the modules are exemplary. The modules may be combined, integrated, separated, and/or duplicated to support various applications. Also, a function described herein as being performed at a particular module may be performed at one or more other modules and/or by one or more other devices instead of or in addition to the function performed at the particular module. Further, the modules may be implemented across multiple devices and/or other components local or remote to one another. Additionally, the modules may be moved from one device and added to another device, and/or may be included in both devices. It is further noted that the software described herein may be tangibly embodied in one or more physical media, such as, but not limited to, a compact disc (CD), a digital versatile disc (DVD), a floppy disk, a hard drive, read only memory (ROM), random access memory (RAM), as well as other physical media capable of storing software, and/or combinations thereof. The functions described as being performed at various components may be performed at other components, and the various components may be combined and/or separated. Other modifications also may be made.

Figure 1:
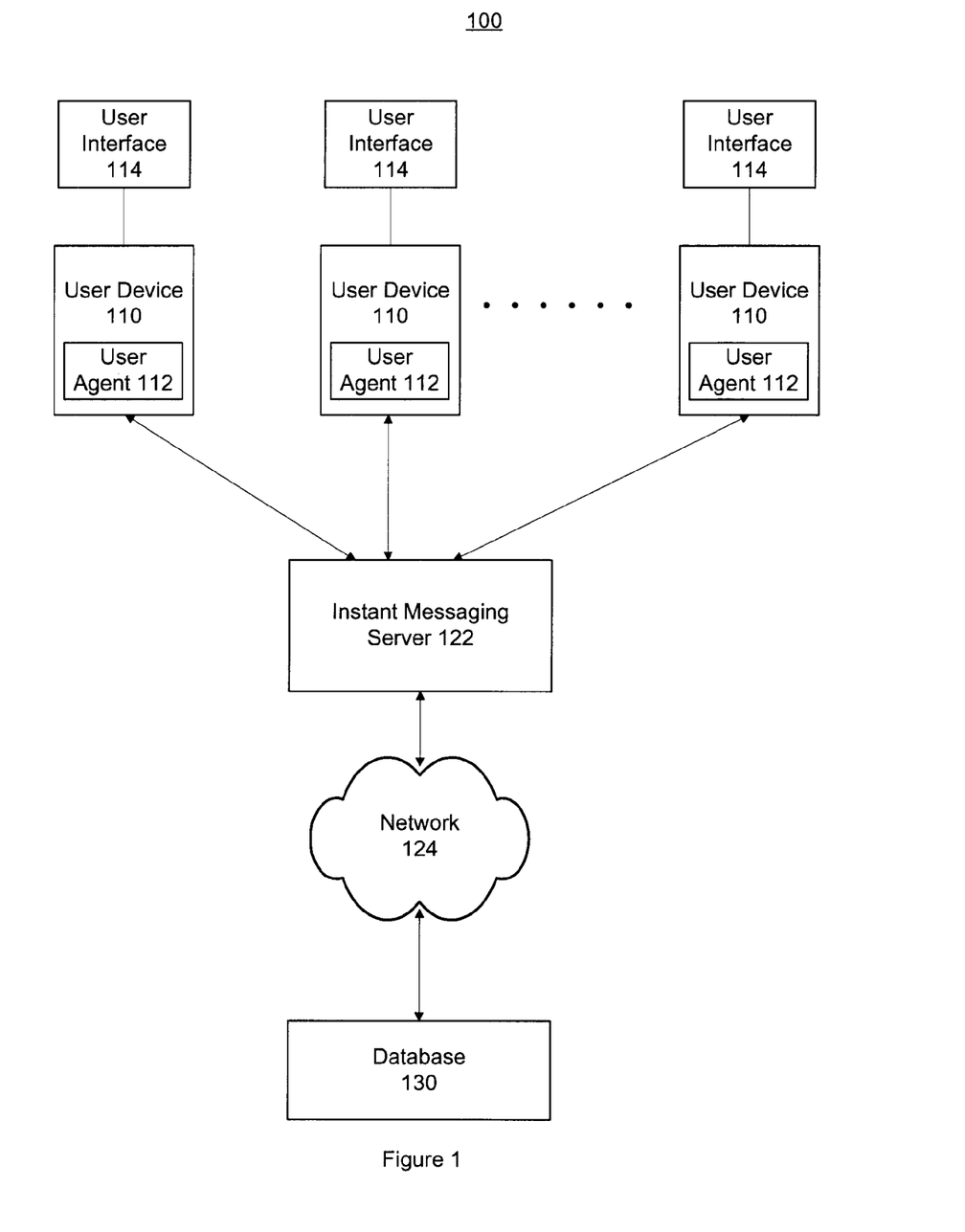
FIG. 1 illustrates a system for providing a role based group instant messaging chat session, in accordance with an exemplary embodiment.

FIG. 1 illustrates a system for providing a role based group instant messaging chat session, in accordance with an exemplary embodiment. System 100 illustrates an exemplary system for instant messaging chat session, in particular providing real-time or near real-time communication and/or identification of one or more new participants to the instant messaging chat session. As illustrated, user device 110 may be coupled to user interface 114. User device 110 may include a user agent 112 for communicating with an instant messaging server 122. Instant messaging server 122 may provide an instant messaging chat session to a plurality of user devices 110. As illustrated in FIG. 1, database 130 may be in a communication with the instant messaging server 122, through network 124. One may appreciate that only one database 130 is illustrated in FIG. 1, however, a plurality of databases 130 may be implemented in accordance to one or more design specification of the system 100. The various components of system 100 may be further duplicated, combined and/or integrated to support various applications and platforms. Also, the various components of system 100 may be located at one location within a server and/or remotely located from each other. Additional elements may also be implemented in the system to support various applications.

In an exemplary embodiment, one or more users associated with the user devices 110 may be participating in a group instant messaging chat session. The group instant messaging chat session may be to resolve a crisis situation (e.g., technical crisis, financial crisis, emergency, etc). One or more new participants may utilize the user interface 114 associated with the user device 110 to enter an instant messaging chat session. The user agent 112 associated with the user device 110 may send one or more signals to the instant messaging server 122 to enter the instant messaging chat session. The instant messaging server 122 may access database 130 via the network 124 to obtain one or more characteristics associated with the one or more new participants. The instant messaging server 122 may inform one or more participants of the instant messaging chat session of an escalation level (e.g., via visual notification and/or audio notification) based at least in part on the one or more characteristics associated with the new participants.

User device 110 may represent a device that manages user interface 114. User device 110 may include computers, desktop computers, laptop computers, telephones, digital telephones, analog telephones, cellular communication devices, facsimile devices, teletype (TTY) equipments, global positioning systems (GPS), workstations, mobile devices, handheld PCs, personal digital assistants (PDA), thin systems, fat systems, network appliances, paging devices, alert devices, televisions, interactive televisions, receivers, tuners, high definition (HD) televisions, HD receivers, and/or other devices that may allow a user to communicate with the instant messaging server 122.

User device 110 may contain one or more user agents 112. User agent 112 may be integrated with the user device 110 or remote from the user device 110. User agent 112 may perform interworking between instant messaging signaling and user interface 114 actions. For example, user agent 112 may manage an exchange of media (e.g., audio, visual, text, data, etc.) between user interface 114 and a media stream of an instant messaging session set up by the instant messaging server 122. User interface 114 may be a graphical user interface including touch screen interfaces, self-service interfaces, automated interfaces, text user interfaces, voice recognition interfaces and/or biometric interfaces, and/or other interfaces that enable a user to communicate with the instant messaging server 122. Also, the user interface 114 may include a keyboard, a keypad, a voice recognition system and/or other devices that allow a user to input information. The user device 110 may participate in one or more instant messaging chat session hosted by the instant messaging server 122. Also, the user device 110 may originate calls to and receive calls from other user devices 110.

Instant messaging Server 122 may represent jabber servers, XWPP servers, Microsoft servers, IBM servers, UNIX servers, SIP proxy or other application servers that enables an instant messaging chat session for one or more user devices 110. For example, instant messaging server 122 may manage a uniform resource locator (URL), an Internet Protocol (IP) address, a SIP Address of Record (AOR) on behalf of user device 110. User device 110 may register with the instant messaging server 122 and send a signal through instant messaging server 122 to other elements, such as other user devices 110 and/or the database 130. For example, a user device 110 may transmit an instant messaging chat session signal to the instant messaging server 122, which in turn allows other user devices 110 to join the chat session. Also, a user device 110 may transmit a bridge call signal to the instant messaging server 122, which in turn may allow other user devices 110 to join a bridge call session. Instant messaging server 122 may process the instant messaging signal transmitted by the user device 110, or may simply forward the instant messaging signal to and from other user device 110 and/or database 130. Instant messaging server 122 may access the database 130 to obtain one or more characteristics associated with the one or more new participants.

Network 124 may be a wireless network, a wired network or any combination of wireless, wired and/or other network. For example, network 124 may include wireless LAN, Global System for Mobile Communication (GSM), Personal Communication Service (PCS), Personal Area Network (PAN), D-AMPS, Wi-Fi, Fixed Wireless Data, satellite network, IEEE 802.11a, 802.11b, 802.15.1, 802.11n and 802.11g and/or any other similar wireless network. Also, network 124 may include telephone line, fiber optics, IEEE Ethernet 802.3, wide area network (WAN), local area network (LAN), and global network such as the Internet. Further, network 124 may enable, a wireless communication network, a cellular network, an Intranet, or the like, or any combination thereof. In addition, network 124 may further include one, or any number of the exemplary types of networks mentioned above operating as a stand-alone network or in cooperation with each other.

Database 130 may represent one or more databases for storing information associated with one or more instant messaging participants. Database 130 may be a mobile storage unit and/or a stationary storage unit. For example, database 130 may be paper card storage, punched card, tape storage, paper tape, magnetic tape, disk storage, gramophone record, floppy disk, hard disk, ZIP disk, holographic, molecular memory or other similar storage devices. Database 130 may also include optical disc, CD-ROM, CD-R, CD-RW, DVD, DVD-R, DVD-RW, DVD+R, DVD+RW, DVD-RAM, Bluray, Minidisc, HVD and Phase-change Dual storage device or other storage devices capable of storing information. Database 130 may further include magnetic bubble memory, magnetic drum, core memory, core rope memory, thin film memory, twistor memory, flash memory, memory card, semiconductor memory, solid state semiconductor memory or other storage devices capable of storing information.

Figure 2:
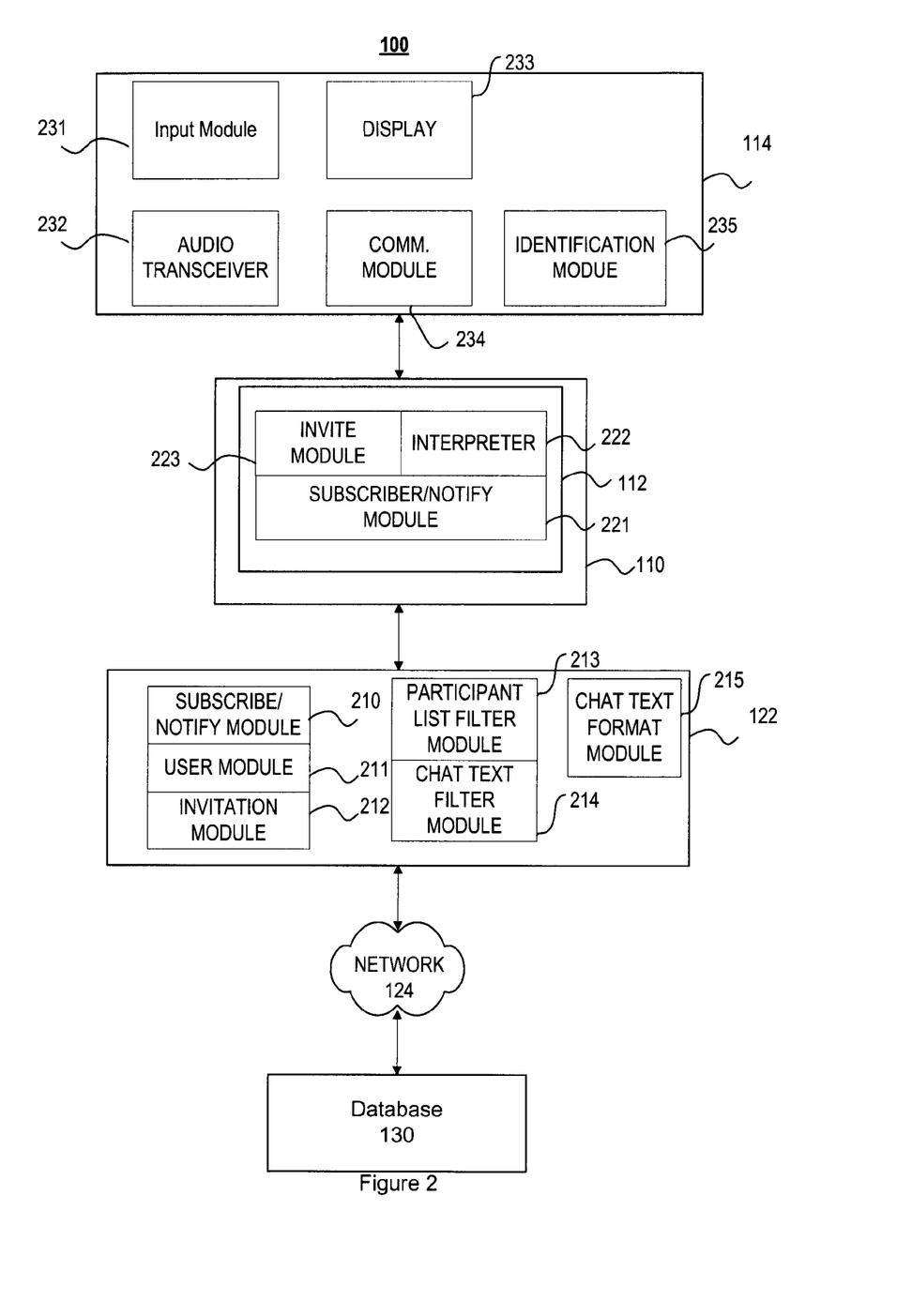
FIG. 2 illustrates a detailed system for providing a role based group instant messaging chat session, in accordance with an exemplary embodiment.

FIG. 2 illustrates a detailed system for providing role based group instant messaging chat session, in accordance with an exemplary embodiment. As shown in FIG. 2, system 100 may include an instant messaging server 122, a user device 110, a user interface 114 and a database 130. Further, as shown in FIG. 2, an instant messaging server 122 may be coupled to database 130 via a network 124. In various exemplary embodiments, network 124 may be a wired network, a wireless network or a combination of both wired and wireless network. For example, network 124 may enable a transfer of information from the instant messaging server 122 to the database 130 and/or from the database 130 back to the instant messaging server 122.

Instant messaging server 122 may include network elements (not shown in FIG. 2) that provide services to one or more users associated with the user device 110. As shown in FIG. 2, instant messaging server 122 may include a subscribe/notify module 210 to receive and/or transmit SUBSCRIBE and NOTIFY requests as will be described in greater detail below. The instant messaging server 122 may also include an invitation module 212 to transmit one or more INVITE requests as will be described in greater detail below.

According to various embodiments, user device 110 may be an instrument to which an end user may send and receive instant messages, bridge calls and other services that may be provided. User device 110 may include a user agent 112. For example, the user agent 112 may be associated with the user device 110 and/or integrated with the user device 110. User agent 112 may include a subscriber/notify module 221, an interpreter module 222 and an invite module 224. In an exemplary embodiment, the subscriber/notify module 221, the interpreter module 222, and the invite module 223 may comprise a single module to receive and/or transmit SUBSCRIBE, NOTIFY, and INVITE requests to enable a role based group instant messaging and/or bridge calls, for example. The interpreter module 222 may interpret one or more signals transmitted by the user device 110 and/or the instant messaging server 122.

User interface 114 may provide a facility through which a user may interact with the instant messaging server 122 in order to initiate, receive and/or transmit instant messaging chat session and/or a bridge call session. In an exemplary embodiment, user interface 114 may be a computer, a telephone or like devices. Also, user interface 114 may include a computer emulating a telephone, for example. As shown in FIG. 2, user interface 114 may include an input module (e.g., a keyboard, keypad, a dual-tone multi-frequency (DTMF) signal generator) 231, an audio transceiver module 232, a display module 233, a communications module 234, and an identification module 235.

In an exemplary embodiment, input module 231 may include one or more keyboards and/or key pad for inputting information. Also, the input module 231 may include a DTMF signal generator including twelve DTMF keys or a rotary dial similar to those on conventional telephones. In such an embodiment, a user may press the DTMF keys or move the rotary dial, respectively, to generate DTMF signals. Further, DTMF signal generator may include a computer emulating twelve DTMF keys. In such an embodiment, a user may interact with the computer to generate DTMF signals. Moreover during a bridge call session to resolve a crisis situation, one or more participants may use the input module 231 to input a key combination to inquire about an escalation level associated with the bridge call session. In addition, one or more participants in a bridge call session may input a key combination to inquire the names, management level/role, and/or business organization associated with the one or more participants in the bridge call session.

Audio transceiver module 232 may provide a facility to transmit and receive audio signals. In an exemplary embodiment, audio transceiver may include a microphone, earphone, speaker, and/or the like.

Display module 233 may cause the display of an instant messaging window for the group chat session. Also, the display module 233 may be display verbal and/or graphical messages to the user. For example, the display module 233 may display one or more instant messages in the instant messaging window and/or identification information associated with instant messaging participants. In another exemplary embodiment, the display module 233 may display the phrase "Bridge Call?" to a user to invite the user to a bridge call session. Furthermore, display module 233 may cause display caller identification, capable of displaying the title, escalation level, name and number associated with one or more participants to the bridge call session.

Communications module 234 may provide a facility to communicate with the user device 110 and/or the user agent 112. Communications module 234 may include an analog telephone port, a wireless port, a wireless link, an Ethernet link, a fiber optic link bus, circuitry, or any other means for coupling user interface 114 with user device 110 and/or user agent 112, for example.

Identification module 235 may provide information associated with one or more participants in an instant messaging chat session and/or a bridge call. For example, information associated with the one or more participants may include titles, management level/role, biographical information, technical background, password, telephone numbers (e.g., work, home, cell, etc), business organizations and/or other characteristics identifying a participant. Also, identification module 235 may provide identification to the user regarding the types of service provided. For example, identification module 235 may provide an invite message indicator, an indication of a service (e.g., group chat session, and/or conference bridge call), an indication of the escalation level, or the like. Identification module 235 may include indicator lights (e.g., red color, orange color, yellow color, gray color, blue color, green color, and/or other colors) indicator ring tones, indicator of transmitting/receiving information, for example, and/or graphical representations that may appear on the display.

In an exemplary embodiment, one or more new participants may enter a group instant messaging chat session. The identification module 235 may notify an escalation level (e.g., via visual notification and/or audio notification) associated with the group instant messaging chat session before, at real-time, at same time, or near real-time the new participant may be logged into the group instant messaging chat session. In an exemplary embodiment, the identification module 235 may indicate an escalation level via one or more flags displayed on a messaging window of the group instant messaging chat session. For example, the identification module 235 may display one flag associated with a manager, two flags associated with a director, and three flags associated with an executive officer. Also, the identification module 235 may display various colors (e.g., yellow, orange, red, etc.) associated with a messaging window to indicate an escalation level associated with an instant messaging chat session. In an exemplary embodiment, the identification module 235 may display a yellow color for a manager escalation level, an orange color for a director escalation level, and/or a red color for an executive director escalation level. The color associated with each escalation level may be predetermined by the instant messaging server 122 or the one or more participants in the group instant messaging chat session. Additionally, the identification module 235 may display textual display associated with a messaging window to indicate an escalation level associated with an instant messaging chat session. In an exemplary embodiment, the identification module 235 may display a text message of a manager escalation level, a director escalation level, and/or an executive director escalation level on the messaging window. In addition, the identification module 235 may include a key and/or a legend indicating one or more colors flags associated with a level of escalation associated with a crisis situation. Also, the key and/or the legend may indicate a hierarchy of a management level/role (e.g., team member, managers, directors, and/or executive directors) associated with one or more participants in the group instant messaging chat session.

Also for example, the identification module 235 may alert one or more participants in a group instant messaging chat session of a rise in an escalation level. In an exemplary embodiment, a messaging window associated with the group instant messaging chat session may display a default gray color associated with a basic escalation level (e.g., field technician, developer) for a crisis situation. In the event that a manager and/or a director may join the group instant messaging chat session, the identification module 235 may alert the one or more existing participants in the group instant messaging chat session of a rise in the escalation level. The identification module 235 may flash (e.g., for a predetermined number of flashes and/or for a predetermined period of time) and/or change of color of the messaging window for the group instant messaging chat session from the default gray color to a yellow and/or a orange color associated with the manager and/or the director. Furthermore, the identification module 235 may indicate a number of managers and/or directors participating in the group instant messaging chat session. Also, the identification module 235 may indicate the business organization (e.g., subsidiaries, partnerships, etc.) associated with mangers and/or directors. For example, identification module 235 may assign a number or dots to identify the number of manager and/or directors participating in the group instant messaging chat session. Additionally, the identification module 235 may indicate and/or differentiate the names of managers, directors, executive directors and their respective business organizations participating in the instant messaging chat session.

Furthermore, one or more directors may be participating in a group instant messaging chat session to resolve a crisis situation. The identification module 235 may display an orange color for the messaging window for the group instant messaging chat session. In the event that a manager may join the group instant messaging chat session and the escalation level associated with the crisis situation may remain the same. The identification module 235 may alert one or more participants in the group instant messaging chat session that the manager joined the group instant messaging chat session. For example, the identification module 235 may cause the messaging window to flash in yellow color temporarily (e.g., 5-10 flashes) to identify that the manager has joined the group instant messaging chat session. Subsequently, the messaging window may return to the orange color to identify the director escalation level of the crisis situation.

In addition, the identification module 235 may identify seriousness and/or an urgency of a crisis situation via visual notification and/or audio notification. For example, the identification module 235 may identify seriousness and/or an urgency of the crisis situation by low, medium or high in a messaging window. For example, a crisis situation may involve a switch being inoperable in a network; the identification module 235 may identify the crisis situation as medium seriousness and/or urgency. The identification module 235 may notify one or more participants to the instant messaging chat session by display a text message and/or sounding a low-decibel ring tone. Also, a crisis situation may involve a large area of a network (e.g., along the Atlantic coast) being inoperable, the identification module 235 may identify the crisis situation as high seriousness and/or urgency. The identification module may notify the one or more participants to the instant messaging chat session by bolding and/or underlining a text message and/or sounding a high-decibel ring tone. Moreover, the identification module 235 may provide the seriousness and/or an urgency of the crisis situation to the instant messaging server 122. The instant messaging server 122 may notify and/or invite a level of management in accordance to the seriousness and/or the urgency of the crisis situation. For example, the instant messaging server 122 may notify and/or invite a manager for a low seriousness and/or urgency, a director for a medium seriousness and/or urgency, or an executive director for a high seriousness and/or urgency.

In another exemplary embodiment, one or more participants may be in a bridge call session to resolve a crisis situation. The identification module 235 may announce an escalation level (e.g., a manager, a director and/or an executive director level, etc) associated with the bridge call session before a new participant may be logged into the bridge call session. Also, in the event that a new participant entering a bridge call session having a higher management level than the one or more existing participants in the bridge call session, the identification module 235 may alert the one or more existing participants of a rise in an escalation level. For example, the identification module 235 may alert the one or more existing participants by three beeps and/or alarm tones to indicate a rise in the escalation level.

As noted above, subscribe/notify module 210 and subscriber/notify module 221 may receive and transmit SUBSCRIBE, NOTIFY and/or INVITE signals. In an exemplary embodiment, the modules may transmit and receive SUBSCRIBE, NOTIFY and/or INVITE signals for an instant messaging chat session and/or a bridge call session. In such an embodiment, the user agent 112 may launch an instant messaging chat session and/or a bridge call session to other users in the network, for example, thus enabling the user agent 112 to receive notifications regarding the instant messaging chat session and/or the bridge call session. Also, the user agent 112 may receive an invitation to an existing instant messaging chat session. In an exemplary embodiment, the user agent 112 may launch a group instant messaging chat session and/or a bridge call session and receive communication (e.g., textual, voice) from other participants in the chat session and/or the bridge call session. Also for example, the user agent 112 may transmit a launch signal to join an already existing group instant messaging chat session and/or a bridge call session.

According to this exemplary SUBSCRIBE, NOTIFY and/or INVITE capability, a participant may receive NOTIFY signals from notifiers (e.g., an instant messaging server) via the user agent 112. The NOTIFY signal may contain information associated with the one or more participants in a group instant messaging chat session and/or a bridge call session and/or communications from other participants. A participant may generate SUBSCRIBE signals and transmit the SUBSCRIBE signals to create a group instant messaging chat session and/or a bridge call session. A notifier may also accept SUBSCRIBE signals to join a group instant messaging chat session and/or a bridge call session. A notifier may generate notification signals for the purpose of notifying one or more participants of the creation of the group instant messaging chat session and/or the bridge call session. Also, one or more existing participants in an existing instant messaging chat session may generate one or more INVITE signals to one or more new participants. The one or more new participants may join the existing instant messaging chat session upon receiving one or more INVITE signals.

In an exemplary embodiment, SUBSCRIBE signals may include an "Event" header which may include a general description of the crisis situation. In such an embodiment, the "Event" header may indicate which crisis situation or seriousness of crisis situations to which the participants are to resolve. Also, the "Event" header may include a token which indicates the state of the crisis situation for which a group instant messaging chat session and/or a bridge call session is being requested.

One or more SUBSCRIBE signals may be a dialog-creating method. For example, when a participant wishes to create or join a group instant messaging chat session and/or a bridge call session, the participant may form and transmit a SUBSCRIBE message. This SUBSCRIBE message may then be confirmed with a response in the form of a NOTIFY signal, for example.

In an exemplary embodiment, NOTIFY signals and/or messages may be sent to inform one or more participants of a creation of a group instant messaging chat session and/or a bridge call session. In such an embodiment, NOTIFY requests may contain "Event" headers that may contain information associated with the crisis situation, for example. The "Event" package name may correspond to the "Event" header in the corresponding SUBSCRIBE signal. The NOTIFY signals may also contain "Message" which may include communications between one or more participants, and may also contain the state and/or the escalation level of the crisis situation.

As noted above, invitation module 212 of the instant messaging server 201 and invite module 223 of the user agent 112 may transmit and receive INVITE signals to create a group instant messaging chat session and/or a bridge call session. In an exemplary embodiment, other elements in an exemplary system may contain invitation modules to create a group instant messaging chat session and/or a bridge call session. In an exemplary embodiment, INVITE signals may be used to create a group instant messaging chat session and/or a bridge call session as will be described in greater detail below.

In such an embodiment, the INVITE signal may enable the transmitting participant to invite one or more participants to join an existing or ongoing group instant messaging chat session and/or a bridge call session. In an exemplary embodiment, INVITE signal may request that the recipient (identified by a request Uniform Resource Locator (URL)) should reply to the transmitting participant. Also, the INVITE signal may include "EVENT" header including a brief description of an escalation level of a crisis situation. Moreover, the INVITATION signal may include information associated with one or more participants that have already joined the group instant messaging chat session and/or the bridge call session. In addition, the INVITE signal may contain an "Invitation" header field to identify the third-party to be contacted.

Participant list filter module 213 of the instant messaging server 122 may include one or more databases for maintaining a participant table. The participant table may include information associated with one or more participants in a group instant messaging chat session and/or a bridge call session. For example, the information associated with the one or more participants may include titles, management level/role, biographical information, technical background, password, telephone numbers (e.g., work, home, cell, etc), business organizations and/or other characteristics identifying each participant. The participant list filter module 213 may categorize one or more participants based at least in part on the information associated with the one or more participants. For example, the participant list filter module 213 may categorize the one or more participants on a management level/role. Therefore, a participant in a group instant messaging chat session and/or a bridge call session may easily identify one or more participants in accordance to the management level/role. One or more participants in a group instant messaging chat session and/or a bridge call session may select one or more management level/role to view one or more participants associated with the selected one or more management level/role. Also, participant list filter module 213 may access and/or obtain information associated with one or more participants from the database 130. In an exemplary embodiment, during an instant messaging chat session, the participant list filter module 213 may maintain a list of participants in the instant messaging chat session by a level of management associated with the one or more participants. Also, the one or more participants may select on a name of the participant to obtain information associated with the selected participant. For example, in the event that one or more new participants joined an instant messaging chat session, the participant list filter module 213 may access and/or obtain information associated with the one or more new participants.

Chat text filter module 214 may include one or more databases for maintaining a communication table. The communication table may include one or more messages transmitted by one or more participants in a group instant messaging chat session and/or a bridge call session. Also, the communication table may include information associated with the one or more participants include titles, management level/role, biographical information, technical background, password, telephone numbers (e.g., work, home, cell, etc), business organizations and/or other characteristics identifying a participant. The chat text filter module 214 may categorize the one or more messages associated with the one or more participants based at least in part on the information associated with the one or more participants. For example, the chat text filter module 213 may categorize the one or more messages based at least in part on a management level/role associated with the one or more participants. Therefore, a participant in a group instant messaging chat session and/or a bridge call session may easily identify one or more messages associated with the one or more participants in accordance to the management level/role. Moreover, the one or more messages associated with the one or more participants selected by the participant may be displayed in a disparate messaging window. The chat text filter module 214 may access and/or obtain information associated with one or more participants from the database 130.

Chat Text format module 215 may assign a text format to the one or more messages transmitted by the one or more participants in a group instant messaging chat session and/or a bridge call session. For example, the text format may include a font color, font type, font style, font size, font effects and/or other text format that may distinguish one or more messages. Also, the chat text format module 215 may access and/or obtain information associated with the one or more participants from the database 130. In an exemplary embodiment, the chat text format module 215 may assign a disparate font color to different management level/role. The chat text format module 215 may assign a green color text from a technical developer, a yellow color text from a manager, an orange color text from a director, and a red color text from a chief operating officer.

User module 211 may enable the instant messaging server 122 to access the database 130 to obtain information associated with one or more participants in a group instant messaging chat session and/or a bridge call session. For example, the user module 211 may receive authentication information (e.g., user name, password) from a user to identify the user. The user module 211 may access the database 130 to obtain information associated with the user. The information obtained by the user module 211 may include titles, management level/role, biographical information, technical background, password, telephone numbers (e.g., work, home, cell, etc), business organizations and/or other characteristics identifying a participant. Also, the user module 211 may identify a user to a bridge call session via a telephone number and/or a caller ID. For example, a participant to a bridge call session may dial in from a work telephone. The user module 211 may utilize the work telephone number to identify information associated with the participant. Moreover, a participant to a bridge call session may dial in from an unknown telephone number, the user module 211 may identify the participant by authentication information associated with the participant. Therefore, the user module 211 may access the database 130 to identify information associated with the participant.

Figure 3:
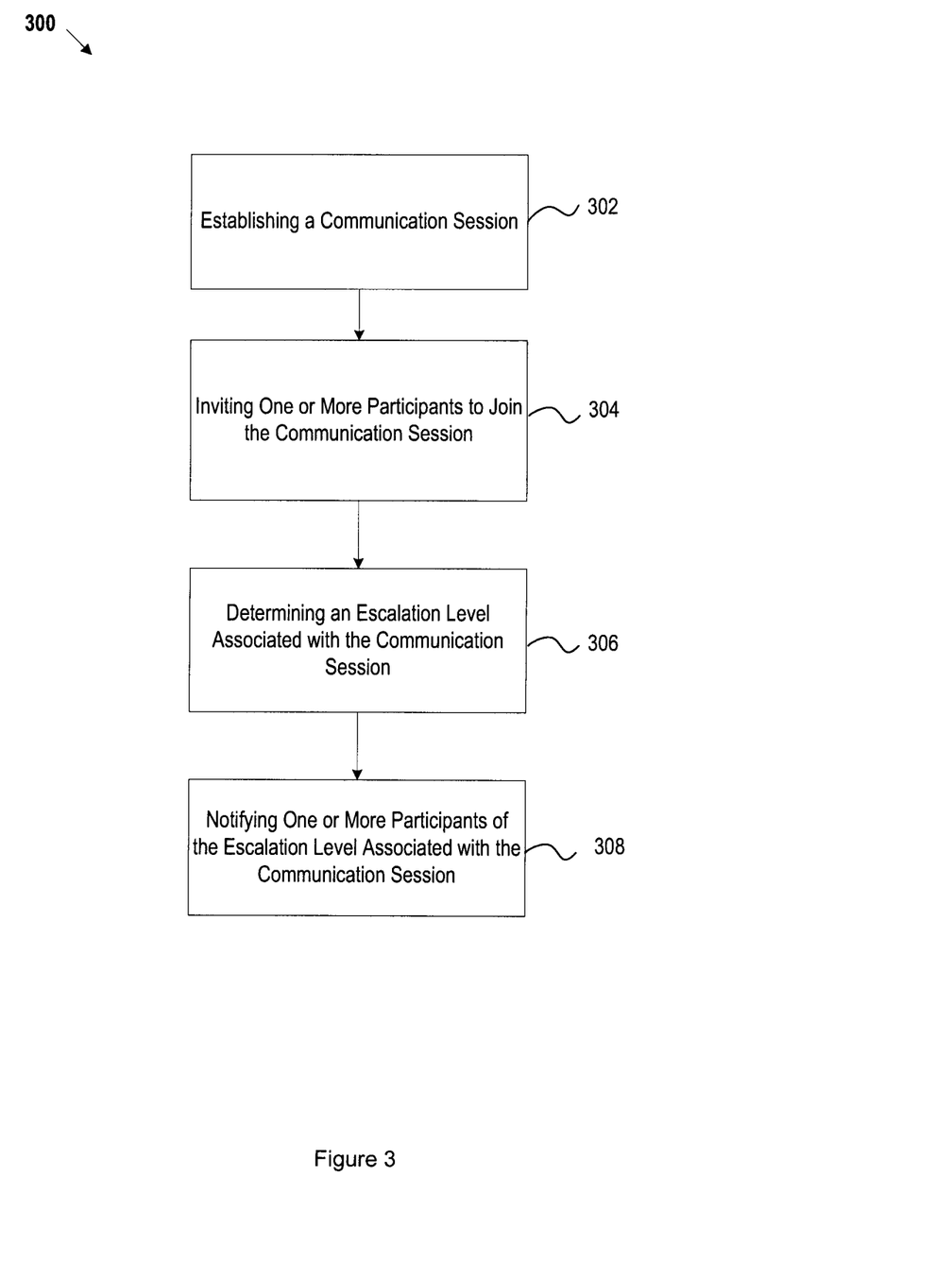
FIG. 3 illustrates a method for providing a role based group instant messaging chat session, in accordance with an exemplary embodiment.

FIG. 3 illustrates a flow diagram of a method 300 for providing a role based group instant messaging chat session and/or a bridge call session, in accordance with exemplary embodiment. This exemplary method 300 is provided by way of example, as there are a variety of ways to carry out the method. The method 300 shown in FIG. 3 can be executed or otherwise performed by one or a combination of various systems. The method 300 is described below may be carried out by the system 100 shown in FIGS. 1 and 2 by way of example, and various elements of the system 100 are referenced in explaining the example method of FIG. 3. Each block shown in FIG. 3 represents one or more processes, methods or subroutines carried out in exemplary method 300. Referring to FIG. 3, exemplary method 300 may begin at block 302.

At block 302, an originating destination (e.g., participant) may establish and/or join a group instant messaging chat session and/or a bridge call session. For example, a user agent 112 associated with the original destination may submit a SUBSCRIBE signal to an instant messaging server 122. The group instant messaging chat session and/or the bridge call session may enable the original destination to transmit and/or receive communications messages to other destinations (e.g., other participants). The user agent 112 of the original destination may be pre-programmed to transmit such a SUBSCRIBE signal, or may receive INVITE signals which may instruct the user agent 112 to transmit such a SUBSCRIBE signal. The instant messaging server 122 may also authenticate and/or authorize the SUBSCRIBE signal prior to enabling the group instant messaging chat session and/or the bridge call session. The method 300 may continue to block 304.

At block 304, one or more participants may be invited to join a group instant messaging chat session and/or a bridge call session by one or more participants. In an exemplary embodiment, a participant may transmit an INVITE signal to the instant messaging server 122 to create a communication dialog between the participant and the instant messaging server 122. The method 300 may continue to block 306.

At block 306, the instant messaging server 122 may determine an escalation level (e.g., based on information associated with one or more participants) associated with a crisis situation for the instant messaging chat session. Also, the instant messaging server 122 may determine a seriousness of an escalation event. For example, a participant associated with the other destinations may use the user interface 114 to invite/join a group instant messaging chat session and/or a bridge call session. The participant list filter module 213 of the instant messaging server 122 may notify the participant associated with the original destination of the new participant. For example, the participant list filter module 213 may maintain a list of participants in the group instant messaging chat session and/or the bridge call session. The participant list filter module 213 may notify the participant associated with the original destination/other destinations the escalation level (e.g., level of management involved) of the crisis situation. Also, a participant associated with the original destination may use the user interface 114 to join a group instant messaging chat session and/or a bridge call session. The user module 211 of the instant messaging server 122 may identify information associated with the participant associated with the original destination. The participant list filter module 213 may receive information associated with the participant at the original destination. The participant list filter module 213 may determine whether the management level/role of the participant associated with the original destination is higher than any other participants in the group instant messaging chat session and/or the bridge call session. Additionally, the instant messaging server 122 may identify seriousness and/or an urgency of the crisis situation by low, medium or high. The method may continue to block 308.

At block 308, the participants associated the original destination/other destinations may be notified of an escalation level associated with a crisis situation. Also, the participants associated with the original destination/other destinations may be notified of a seriousness of a crisis situation. For example, the participant associated with the original destination/other destinations may be associated with a management level/role that is higher than any other participants in the group instant messaging chat session and/or the bridge call session, the participants list filter module 213 may send an escalation signal to the identification module 235, to alert participants in the group instant messaging chat session and/or the bridge call session a rise in the escalation level. Moreover, the participant associated with the original destination may be associated with a management level/role that is equivalent to or lower than one or more participants in the group instant messaging chat session and/or the bridge call session. The participants list filter module 213 may transmit an escalation signal to the identification module 235 to identify an escalation level (e.g., management level/role) associated with the crisis situation. In addition, the identification module 235 may identify seriousness and/or an urgency of the crisis situation by low, medium or high in a messaging window.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

The invention claimed is:

1. A method, comprising:
establishing, using a computer processor, a communication session associated with a situation;
receiving, via a network, one or more requests to join the established communication session associated with the situation;
retrieving, from a database, information associated with communication session participants that is associated with the one or more requests, the information comprising at least a management level of each of the communication session participants;
using the computer processor, determining an escalation level associated with the situation based at least in part on the information associated with the communication session participants; and
using the computer processor, notifying each of the communication session participants, via the network, during the established communication session, of the escalation level associated with the situation, upon an additional participant joining or requesting to join the established communication session,
wherein the established communication session comprises at least one of a group instant messaging chat session and a bridge call session.

2. The method of claim 1, wherein notifying the participants of the escalation level comprises visually indicating the escalation level.

3. The method of claim 2, wherein visually indicating the escalation level comprises displaying one or more flags on a messaging window associated with the communication session.

4. The method of claim 2, wherein visually indicating the escalation level comprises displaying various colors on a messaging window associated with the communication session.

5. The method of claim 1, wherein visually indicating the escalation level comprises displaying one or more dots on a messaging window associated with the communication session.

6. The method of claim 1, wherein notifying the participants of the escalation level comprises audibly indicating the escalation level.

7. The method of claim 6, wherein audibly indicating the escalation level comprises sounding one or more alarm tones associated with the communication session.

8. The method of claim 1, further comprising categorizing the participants based at least in part on the information associated with the participants.

9. The method of claim 1, further comprising categorizing one or more messages of the communication session associated with each participant based at least in part on the information associated with each participant.

10. The method of claim 1, further comprising assigning a text format to one or more messages transmitted by each participant in the communication session.

11. The method of claim 10, wherein assigning the text format to one or more messages comprises assigning at least one of a font color, a font type, a font style, a font size, and font effects to the one or more messages.

12. The method of claim 1, wherein the information associated with each participant comprises at least one of titles, biographical information, technical background, password, telephone numbers, and business organizations.

13. A computer readable media comprising code to perform the steps of the methods of claim 1.

14. The method of claim 1, wherein the information associated with each participant comprises a management level for each participant.

15. The method of claim 1, further comprising notifying senders of the one or more requests to join the communication session, via the network, of the escalation level associated with the situation.

16. The method of claim 1, further comprising determining that the management level of the additional participant is higher than the management level of any other communication session participant before notifying the communication session participants of the escalation level associated with the situation.

17. The method of claim 1, further comprising sending an invite to the additional participant to join prior to the additional participant joining or requesting to join the established communication session, and wherein the invite is based on the additional participant's management level and the additional participant's management level corresponds to a seriousness of the situation.

18. A system, comprising:
a computer processor;
a memory;
a communications module executed by the computer processor and configured to establish a communication session associated with a situation;
a subscriber module executed by the computer processor and configured to receive one or more requests to join the established communication session associated with the situation;
a user module executed by the computer processor and configured to identify information associated with communication session participants that is associated with the one or more requests, the information comprising at least a management level of each of the communication session participants;
a participant list filter module executed by the computer processor and configured to determine an escalation level associated with the situation based at least in part on the information associated with the communication session participants; and
an identification module configured to notify the participants of the escalation level associated with the situation upon an additional participant joining or requesting to join the established communication session.

19. The system of claim 18, wherein the identification module configured to visually notify the participants of the escalation level.

20. The system of claim 19, wherein the identification module configured to visually notify the participants of the escalation level comprises displaying one or more flags on a messaging window associated with the communication session.

21. The system of claim 19, wherein the identification module configured to visually notify the participants of the escalation level comprises displaying various colors on a messaging window associated with the communication session.

22. The system of claim 18, wherein the participant list filter module is further configured to categorize each participant based at least in part on the information associated with each participant.

23. The system of claim 18, further comprising a chat text filter module executed by the computer processor and configured to categorize one or more messages of the communication session associated with each participant based at least in part on the information associated with each participant.

24. The system of claim 18, further comprising a chat text format module executed by the computer processor and configured to assign a text format to one or more messages of the communication session transmitted by each participant.

25. The system of claim 24, wherein the chat text format module configured to assign the text format comprises assigning at least one of a font color, a font type, a font style, a font size and a font effects to the one or more messages.

26. The system of claim 18, wherein the information associated with each participant comprises at least one of titles, biographical information, technical background, password, telephone numbers, and business organizations.

27. The system of claim 18, wherein the information associated with each participant comprises a management level for each participant.

* * * * *